United States Patent [19]

Iida et al.

[11] Patent Number: 5,074,123
[45] Date of Patent: Dec. 24, 1991

[54] AIR CONDITIONING CONTROL SYSTEM FOR AUTOMOTIVE VEHICLES

[75] Inventors: Katsumi Iida; Yoshihiko Sakurai; Akihiko Takano; Shigetoshi Doi; Taketoshi Matsushita, all of Fuchu, Japan

[73] Assignees: Zexel Corporation, Tokyo; Mazda Motor Corporation, Hiroshima, both of Japan

[21] Appl. No.: 598,122

[22] Filed: Oct. 16, 1990

[30] Foreign Application Priority Data

Jan. 22, 1990 [JP]  Japan .................................. 2-12262

[51] Int. Cl.⁵ ............................................ F25B 27/00
[52] U.S. Cl. .................................... 62/228.5; 62/158; 62/243
[58] Field of Search ................. 62/228.5, 158, 157, 62/231, 196.3, 196.1, 228.1, 228.3, 243

[56] References Cited

U.S. PATENT DOCUMENTS 4,821,527  4/1989  Suzuki et al. .................. 62/228.5 X
4,898,005  2/1990  Sakurai ............................ 62/228.5 X

FOREIGN PATENT DOCUMENTS 63-184519  7/1988  Japan .

Primary Examiner—Harry B. Tanner
Attorney, Agent, or Firm—Frishauf, Holtz, Goodman & Woodward

[57] ABSTRACT

An air conditioning control system for an automotive vehicle having an internal combustion engine. A variable capacity compressor has a pump having displacement thereof variable in response to a change in pressure within a controlled pressure chamber, a communication passage communicating between a low pressure chamber and the controlled pressure chamber, and a valve disposed to vary an opening area of the communication passage. An electromagnetic clutch connects and disconnects the compressor to and from the engine. An evaporator is connected to the compressor. A control unit controls the capacity of the compressor by supplying the valve with control current normally set within a predetermined range, to vary the opening area of the communication passage such that the temperature of outlet air from the evaporator becomes equal to a desired value. The control unit supplies the control current having a predetermined value larger than the above predetermined range over a predetermined time period to control the capacity of the compressor to the minimum value, when the electromagnetic clutch is brought into an engaged state from a disengaged state.

4 Claims, 4 Drawing Sheets

AIR CONDITIONING CONTROL SYSTEM FOR AUTOMOTIVE VEHICLES

BACKGROUND OF THE INVENTION

This invention relates to an air conditioning control system for automotive vehicles, and more particularly to a system of this kind which has a compressor having capacity thereof controlled at the start of the compressor such that almost no shock is caused by the engine of the automotive vehicle upon engagement of the compressor clutch.

A conventional air conditioning control system for automotive vehicles in general has a compressor forming part of the refrigerating cycle, which is driven by an engine installed in the automotive vehicle, through an electromagnetic clutch. However, immediately when the electromagnetic clutch is brought into engagement to connect the compressor to the engine, a shock is caused by the engine due to a sudden change in torque transmitted from the engine, causing discomfort to the occupant of the vehicle.

In order to prevent such shock, an air conditioning control system for automotive vehicles has been proposed e.g. by Japanese Provisional Patent Publication (Kokai) No. 63-184519, in which a compressor has a pressure control valve arranged therein for leaking pressure within the crank chamber into the low pressure or suction chamber, and a control unit for supplying a control signal (control current) to the pressure control valve for varying the the pressure within the crank chamber and hence the capacity of the compressor.

According to the proposed air conditioning control system, the control signal from the control unit is set to such a large current value as to bring the compressor capacity to the minimum capacity upon engagement of the clutch at the start of the compressor, and thereafter progressively increased to a predetermined current value so as to progressively decrease the pressure within the crank chamber until the compressor capacity increases a predetermined capacity.

However, in the case where the air conditioning control system employs a variable capacity compressor of a wobble plate type which has capacity thereof controlled such that the suction pressure of the compressor is controlled to a predetermined desired value, the capacity actually varies in the following manner: Even if the control signal is set to such a large current value as to bring the capacity to the minimum capacity at the start of the compressor, the pressure control valve is forced to open by suddenly increased pressure within the crank chamber upon starting of the compressor, to leak pressure within the crank chamber into the suction chamber. Consequently, the pressure within the crank case suddenly drops, so that the actual capacity is suddenly increased to the maximum value (instead of being progressively increased) by reduced pressure within the crank chamber. After thus suddenly reaching the maximum value, the actual capacity is progressively decreased to the minimum value, as the pressure within the crank chamber is increased by the control signal. However, it takes at least 10 to 20 seconds to bring the capacity to the minimum value from the start of the compressor.

Therefore, the proposed air conditioning control system had the disadvantage that the shock caused upon starting of the compressor is difficult to reduce, and further such shock in turn results in poor driveability of the engine particularly during idling operation.

SUMMARY OF THE INVENTION

It is the object of the invention to provide an air conditioning control system for automotive vehicles having a compressor which is substantially free from shock upon engagement of the electromagnetic clutch at the start of the compressor, to thereby enhance the driveability.

In order to achieve the above object, the present invention provides an air conditioning control system for an automotive vehicle having an internal combustion engine, the system including a variable capacity compressor having a low pressure chamber, a controlled pressure chamber, pump means having displacement thereof variable in response to a change in pressure within the controlled pressure chamber, communication passage means communicating between the low pressure chamber and the controlled pressure chamber, and valve means disposed to vary an opening area of the communication passage means, an electromagnetic clutch for connecting and disconnecting the compressor to and from the engine, an evaporator connected to the compressor, and control means for controlling capacity of the compressor by supplying the valve means with control current normally set within a predetermined range, to vary the opening area of the communication passage means such that temperature of outlet air from the evaporator becomes equal to a desired value.

The air conditioning control system according to the present invention is characterized by an improvement wherein the control means supplies the control current having a predetermined value larger than the predetermined range over a predetermined time period to control the capacity of the compressor to a minimum value, when the electromagnetic clutch is brought into an engaged state from a disengaged state.

Preferably, the variable capacity compressor is a wobble plate type compressor.

More preferably, the predetermined value of the control current is 1.5–2 times as large as an upper limit of the predetermined range.

The valve means may be a linear solenoid type magnetic valve having a valve opening thereof variable in proportion to the value of the control current.

DETAILED DESCRIPTION

The invention will now be described in detail with reference to the drawings showing an embodiment thereof.

Figure 1:
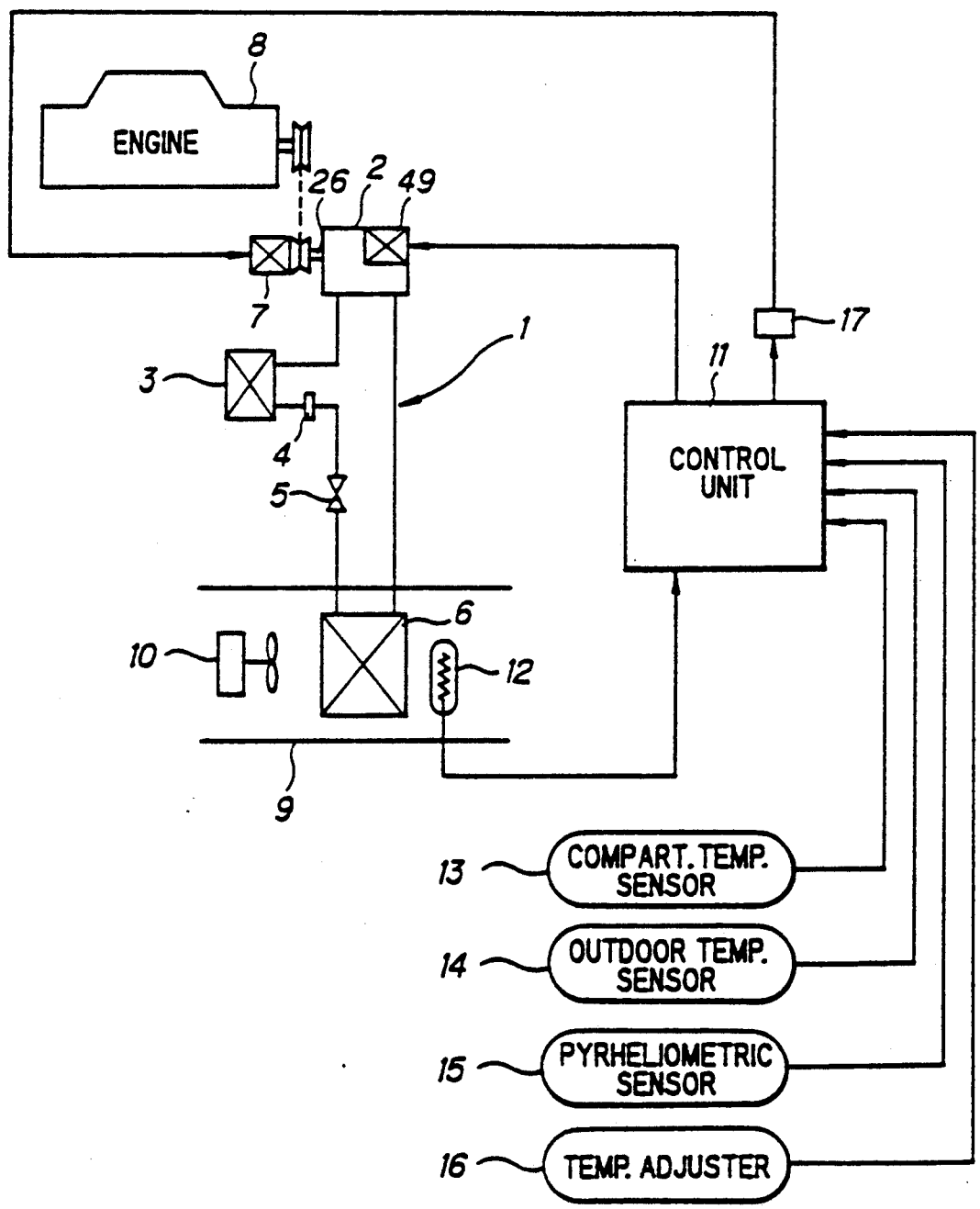
FIG. 1 is a block diagram showing the overall arrangement of an air conditioning control system for automotive vehicles according to an embodiment of the invention.

Referring first to FIG. 1, there is shown the whole arrangement of an air conditioning control system for automotive vehicles according to an embodiment of the invention. In the figure, reference numeral 1 designates a refrigerating cycle, which is principally formed by a compressor 2, a condensor 3, a receiver tank 3, an expansion valve 5, and an evaporator 6, arranged in the mentioned order.

Figure 2:
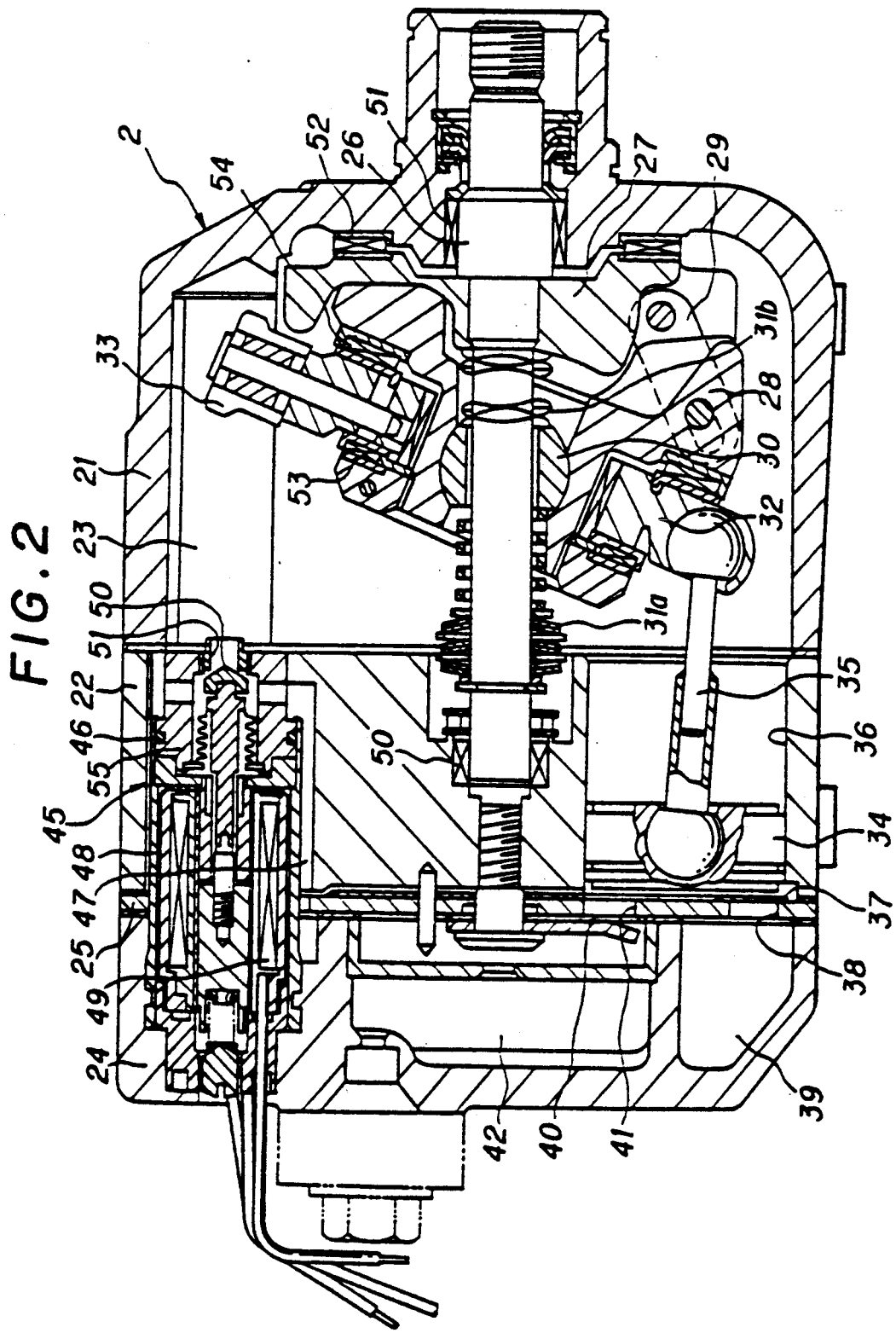
FIG. 2 is a longitudinal cross-sectional view of a variable capacity wobble plate type compressor in FIG. 1.

As shown in FIG. 2, the compressor 2 is a variable capacity wobble plate type compressor, and has a housing 21 in the form of a bottomed cylinder having an open end closed by one end face of a cylinder block 22, which is secured to the housing 21 so as to define together therewith a crank chamber 23 within the housing 21. A cylinder head 24 is secured through a valve plate 25 to the other end face of the cylinder block 22.

A drive shaft 26 is rotatably supported at respective ends by the housing 21 and the cylinder block 22 through bearings 50, 51. A thrust flange 27 is rotatably supported through a thrust bearing 52 by an inner end wall of the housing 21, and secured on the drive shaft 26 for rotation in unison therewith. A drive hub 28 is rotatably fitted on a hinge ball 30 mounted on the drive shaft 26, and has a peripheral edge portion coupled through a link member 29 to the thrust flange 27 for axial swinging motion thereabout. The hinge ball 30 is axially slidably fitted on the drive shaft 26 and urged in opposite directions by elastic members 31a and 31b arranged on the drive shaft 26 on opposite sides thereof.

A wobble plate 32 is rotatably supported by the drive hub 28 through bearings 53, 54, and disposed in axially slidable engagement with an inner peripheral surface of the housing 21 via a slider 33 secured to the inner peripheral surface, so that as the drive shaft 26 is rotated, the wobble plate 32 is caused to swing about the hinge ball 30 while being inhibited from rotation by the slider 33. A plurality of pistons 34 are each pivotally joined to a peripheral edge portion of the wobble plate 32 through respective piston rods 35. Each piston 34 is slidably received within an associated one of cylinder bores 36 formed through the cylinder block 22, to define a compression chamber between the valve plate 25 and the piston 34 within the cylinder bore 36. When the piston 34 is on the suction stroke, a suction valve 37 is opened to open a suction hole 38 formed in the valve plate 25, so that the compression chamber is communicated with a suction chamber 39 formed in the cylinder head 24 via the suction port 38. On the other hand, when the piston 34 is on the discharge stroke, a discharge valve 40 is opened to open a discharge hole 41 formed in the valve plate 25, so that the compression chamber is communicated with a discharge pressure chamber 42 formed in the cylinder head 24 via the discharge hole 41. The suction chamber 39 and the discharge pressure chamber 42 communicate respectively with a suction port and a discharge port, neither of which is shown.

A pressure control valve 45 is received in a valve-receiving hole 46 formed through the cylinder block 22, the valve plate 25, and the cylinder head 24. A low pressure chamber 47 is defined within the cylinder block 22 between the pressure control valve 45 and the valve-receiving hole 46.

The pressure control valve 45 is a linear solenoid valve which has valve opening thereof varied in proportion to the amount of control current applied thereto, and comprises a casing 48, a solenoid 49 accommodated in the casing 48, a valve casing 55, and a valve body 50 accommodated in the valve casing 55, the valve body 50 being movable in response to energization of the solenoid 49 for varying the opening degree of a communication hole 51 formed in the valve casing 55 and communicating between the crank chamber 23 and the low pressure chamber 47. With such arrangement, when control current supplied to the solenoid 49 is increased, for instance, the solenoid 49 generates an increased magnetic attractive force to cause the valve body 50 to move in the direction of closing the communication hole 51, thereby decreasing the amount of refrigerant gas leaking from the crank chamber 23 into the low pressure chamber 47. Consequently, the pressure within the crank chamber 23 is increased by a blow-by gas leaking into the crank chamber 23 from the compression chambers through clearances between the pistons 34 and the cylinder bores 36. The increase in the pressure within the crank chamber 23 increases a force acting upon an end face of each piston 34 facing the crank chamber 23 so that the wobble plate 32 axially swings about the hinge ball 30 in the direction in which the inclination angle of the wobble plate 32 decreases to decrease the stroke of the piston 34 and hence the capacity of the compressor.

Referring again to FIG. 1, the drive shaft 26 of the compressor has an input end thereof connected through the electromagnetic clutch 7 to an output shaft of the engine 8. When the electromagnetic clutch 7 is engaged, output torque of the engine 8 is transmitted through the clutch to the drive shaft 26 of the compressor 2 to drive the same.

The evaporator 6 is arranged within an air duct 9 of the air conditioning control system, for cooling air supplied into the duct 9 by a blower 10, by heat exchange with refrigerant which is supplied from the compressor 2 to the evaporator 6 through the condensor 3 and the expansion valve 5, wherefrom cooled air is supplied through the air duct 9 into the vehicle compartment. The refrigerant from the evaporator 6 is drawn in a gaseous phase into the compressor 2.

A control unit 11, which is formed by a microcomputer, has an input side thereof connected with a temperature sensor 12 for sensing the temperature $T_E$ of cooled air supplied from the evaporator 6 (hereinafter merely called "the outlet air temperature"), a compartment temperature sensor 13 for sensing temperature $T_R$ within the vehicle compartment, an outdoor temperature sensor 14 for sensing ambient temperature $T_A$ outside the vehicle, a pyrheliometric sensor 15 for sensing the intensity $T_S$ of solar radiation, and a temperature adjuster 16 for manually setting a desired temperature $T_D$ within the vehicle compartment. The sensors 12 to 15, and the temperature adjuster 16 supply respective electrical signals representative of sensed and set values to the control unit 11.

The control unit 11 also has an output side thereof connected with the solenoid 49 of the pressure control valve 45 for controlling the capacity of the compressor 2, and a clutch driving circuit 17 for engaging and disengaging the electromagnetic clutch 7 of the compressor 2.

The control unit 11 operates in response to various output signals from the sensors and the temperature adjuster 16, to calculate the value y of a control signal based on which the control current $I_{SOL}$ is supplied to the solenoid 49 of the pressure control valve 45, to thereby control the capacity of the compressor 2, by the use of the following equation (1):

$$y = ax + b \int x \, dt + c \tag{1}$$

where x represents the difference between the actual value of the outlet air temperature $T_E$ and a desired value $T_{EO}$ thereof, i.e. $x = T_E - T_{EO}$, and a, b, and c are constant values. The desired value $T_{EO}$ of the outlet air temperature $T_E$ is determined by reading from a $T_{EO}$ table stored in the control unit 11, in accordance with the value of a total signal T, hereinbelow described. The $T_{EO}$ table is set such that the desired value $T_{EO}$ generally decreases with increase in the value of the total signal T. The total signal represents a desired value T of the temperature of air blown into the vehicle compartment, and is calculated from the actual compartment temperature $T_R$, the outdoor temperature $T_A$, the intensity $T_S$ of solar radiation, the set compartment temperature $T_D$, etc., by the use of the following equation (2):

$$T = A \cdot T_R + B \cdot T_A + C \cdot T_S - D \cdot T_D + E \qquad (2)$$

where A, B, C, and D are constant values, and E a correction term.

As described above, the compressor 2 is controlled such that the actual outlet air temperature $T_E$ becomes equal to the desired value $T_{EO}$, by varying the control current $I_{SOL}$ in accordance with the value y of the control signal calculated based on the difference x between the actual outlet air temperature $T_E$ and the desired outlet air temperature $T_{EO}$ by the use of PI control terms of the equation (1).

The control unit 11 also controls the electromagnetic clutch 7 via the clutch drive circuit 17, by engaging and disengaging the same. More specifically, the electromagnetic clutch 7 is disengaged when the actual outlet air temperature $T_E$ is below a predetermined lower limit value set based on the desired value $T_{EO}$, and engaged when the former is above a predetermined upper limit value also set based on the desired value $T_{EO}$. The predetermined lower limit value is set at such a value as prevents freeze at the outlet of the evaporator 6.

The operation of the air conditioning control system constructed as above will be explained hereinbelow.

Figure 4:
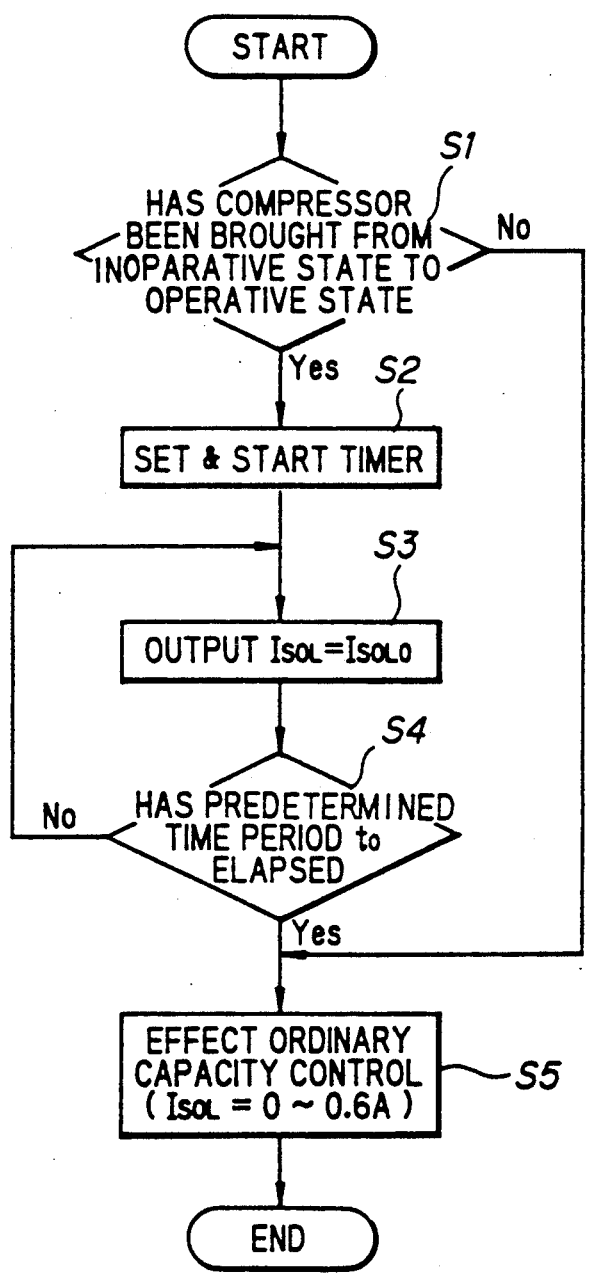
FIG. 4 is a flowchart of a control program for controlling the air conditioning control system.

FIG. 4 shows a control program for controlling the air conditioning control system. The control program is executed in synchronism with generation of a clock signal (e.g. having a pulse repetition period of 0.1 sec.) supplied from a clock circuit, not shown, provided in the control unit 11.

Figure 3:
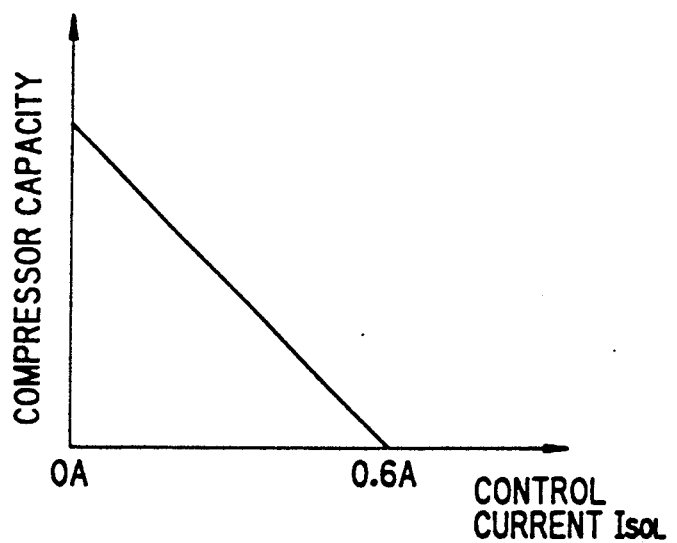
FIG. 3 is a graph showing the relationship between the control current amount and the capacity of the compressor.

At a step S1 in FIG. 4, it is first determined whether or not the compressor 2 has been brought from an inoperative state into an operative state, that is, whether or not the compressor 2 has been started. This determination is executed depending upon whether or not the clutch 7 has been brought from a disengaged state into an engaged state, e.g. when the actual outlet air temperature $T_E$ becomes higher than the predetermined upper limit value set based on the desired value $T_{EO}$, or when the air conditioner switch, not shown, is turned on. If the answer to the question of the step S1 is affirmative or Yes, that is, if the compressor 2 has been brought from an inoperative state into an operative state, or started, a timer is set to a predetermined time period $t_0$, e.g. 2 seconds, to start counting, at a step S2. The predetermined time period $t_0$ is set to such a time period that the pressure within the crank chamber 23 increases to a sufficiently high level by the time the predetermined time period $t_0$ elapses. Then, the control current $I_{SOL}$ is set to a predetermined value $I_{SLO}$ to be supplied to the solenoid 49 of the compressor 2, at a step S3. The predetermined value $I_{SOLO}$ is set to a predetermined value, e.g. 0.9 A, which is larger than the upper limit value (e.g. 0.6 A) of a range (e.g. 0–6 A) within which the control current $I_{SOL}$ is usually set during normal control of the compressor capacity, as shown FIG. 3. Preferably, the predetermined value $I_{SOLO}$ to which the control current $I_{SOL}$ is set at the start of the compressor is set within a range which is 1.5-2 times as large as the upper limit of the normal range.

The reason for supplying such excessive control current $I_{SOLO}$ larger than the upper limit value of the normal range of the control current is as follows: When the compressor is started, if the pressure control valve 45 is then closed by an amount of current, which is equal to the upper limit (e.g. 0.6 A) of the normal range, supplied thereto, there occurs a sudden increase in the pressure within the crank chamber 23, which forcibly opens the pressure control valve 45 to cause leakage of pressure from the crank chamber 23 into the low pressure chamber 47 and hence a decrease in the pressure. Consequently, the wobble plate 32 is caused to swing in the direction of increasing the inclination angle or piston stroke to increase the capacity at the start of the compressor whereby a great engine shock takes place. However, if a large amount of control current $I_{SOLO}$, which is larger than the normal range, e.g. 0–0.6 A, is supplied to the solenoid 49 at the start of the compressor, the communication hole 51 between the crank chamber 23 and the suction chamber 47 is positively held closed by the valve body 50 of the pressure control valve 45, by such a large magnetic attractive force as to fully prevent the valve body 50 from being opened by the suddenly increased pressure within the crank chamber 23. As a consequence, the pressure within the crank chamber 23 is promptly increased to a sufficiently high pressure level to thereby decrease the angle of inclination of the wobble plate, thus preventing an increase in the angle of inclination at the start of the compressor and hence promptly bringing the compressor 2 into a minimum capacity operation.

Referring again to FIG. 4, at a step S4, it is determined whether or not the predetermined time period $t_0$, e.g. 2 seconds, has elapsed after the compressor 2 was started. If the predetermined time period $t_0$ has not yet elapsed, the program returns to the step S3. On the other hand, if the predetermined time period $t_0$ has elapsed, the supply of the large amount of the control current $I_{SOLO}$ is terminated to start ordinary control of the compressor 2, at a step S5, wherein the outlet air temperature $T_E$ is controlled based on the equation (1) for controlling the capacity of the compressor 2 by the control current $I_{SOL}$ set within the normal range of e.g. 0–0.6 A, followed by terminating the program.

On the other hand, if the answer to the question of the step S1 is negative or No, that is, if the compressor 2 is held in an inoperative state or in an operative state, the program jumps over the steps S2 to S4 to the step S5 to execute ordinary control of the capacity of the compressor 2, followed by terminating the program.

What is claimed is:

1. In an air conditioning control system for an automotive vehicle having an internal combustion engine, the system including a variable capacity compressor having a low pressure chamber, a controlled pressure chamber, pump means having displacement which is variable in response to a change in pressure within said controlled pressure chamber, communication passage means communicating between said low pressure chamber and said controlled pressure chamber, and valve means disposed to vary an opening area of said communication passage means, an electromagnetic clutch for connecting and disconnecting said compressor to and from said engine, an evaporator connected to said compressor, and control means for controlling the capacity of said compressor by supplying said valve means with control current normally set within a predetermined range, to vary said opening area of said communication passage means such that temperature of outlet air from said evaporator becomes equal to a desired value, said valve means comprising a linear solenoid type electromagnetic valve having a valve opening thereof which is variable as a function of the value of said control current, the improvement wherein:
said control means including means responsive to said electromagnetic clutch being brought into an engaged state from a disengaged state, for supplying said control current having a predetermined value larger than said predetermined range over a predetermined time period to control the capacity of said compressor to a minimum value, irrespective of a value of the capacity of said compressor assumed immediately before said electromagnetic clutch is brought into an engaged state from a disengaged state.

2. An air conditioning control system as claimed in claim 1, wherein said variable capacity compressor is a wobble plate type compressor.

3. An air conditioning control system as claimed in claim 1, wherein said predetermined value of said control current is 1.5–2 times as large as an upper limit of said predetermined range.

4. An air conditioning control system as claimed in claim 1, wherein said valve opening of said linear solenoid type electromagnetic valve is variable in proportion to the value of said control current.

* * * * *